Jan. 11, 1955
L. YOUNG ET AL
2,699,501
RAPID SCANNING DEVICE
Filed Aug. 2, 1945
2 Sheets-Sheet 1
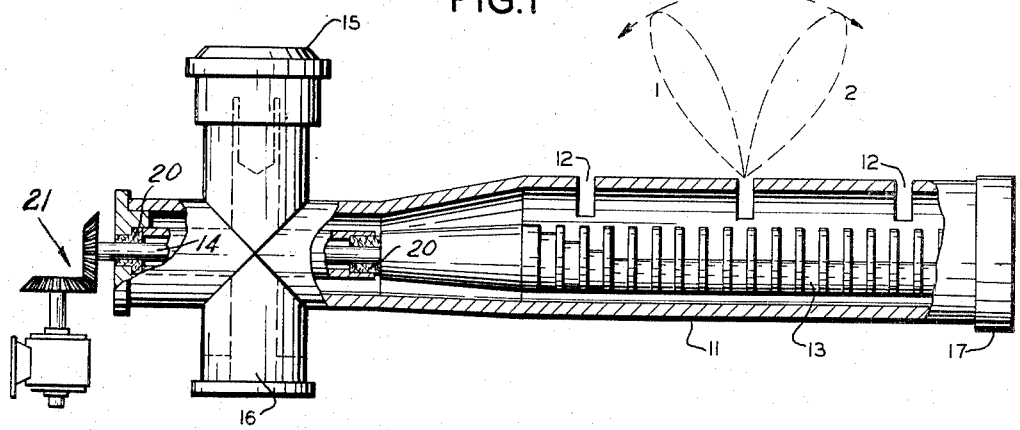
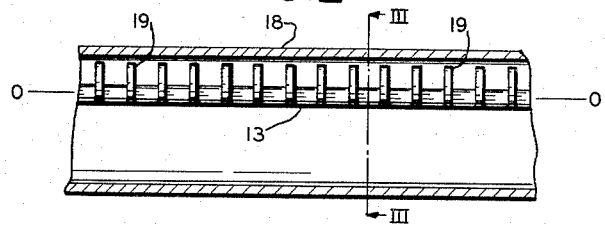 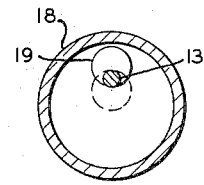
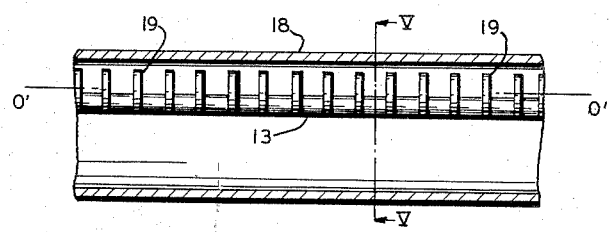 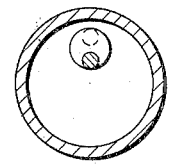
INVENTORS
LOUISE YOUNG
GEORGE G. HARVEY
BY
ATTORNEY

ANGULAR ORIENTATION OF INNER CONDUCTOR

ECCENTRICITY IN INCHES

ECCENTRICITY IN INCHES

INVENTORS
LOUISE YOUNG
GEORGE G. HARVEY

United States Patent Office 2,699,501
Patented Jan. 11, 1955

2,699,501

RAPID SCANNING DEVICE

Louise Young, Winnetka, Ill., and George G. Harvey, Boston, Mass., assignors, by mesne assignments, to the United States of America as represented by the Secretary of the Navy Application August 2, 1945, Serial No. 608,600

12 Claims. (Cl. 250—33.63)

This invention relates to wave guides, and particularly to those which shorten the wave length of the transmitted electrical energy without changing the frequency.

In the patent application Serial No. 504,777, filed October 2, 1943, now U. S. Patent No. 2,567,748 issued September 11, 1951, of Milton G. White are disclosed various embodiments including one of the instant inventions as Figs. 24 and 25 which modify the wave length of the transmitted electrical energy by fixed or variable amounts. Also presented there is a theoretical discussion of the reasons for this phenomenon.

It is an object of this invention to provide a wave guide adapted to shorten the wave length of the transmitted electrical energy.

It is a further object of this invention to provide such wave length shortening without the use of solid dielectric material.

It is a further object of this invention to provide a wave guide adapted to vary at will within a substantial range the wave length of the transmitted electrical energy without varying the frequency thereof.

It is a further object of this invention to provide a wave guide with shortened wave length characteristics with respect to the wave length of energy entering the wave guide while maintaining good energy transfer, low internal reflection, and absence of standing waves.

Other and further objects will appear during the course of the following description where:

Fig. 1 is an elevational view partly broken away of an antenna embracing the invention;

Fig. 2 is a sectional elevation of an embodiment of the invention;

Fig. 3 is a transverse section along the line III—III of Fig. 2;

Fig. 4 is a sectional elevation of a second embodiment of the invention;

Fig. 5 is a transverse section along the line V—V of Fig. 4; and

Figure 6:
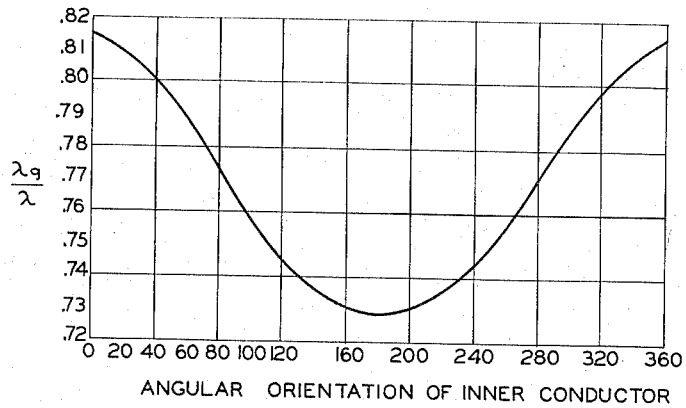
Figure 7:
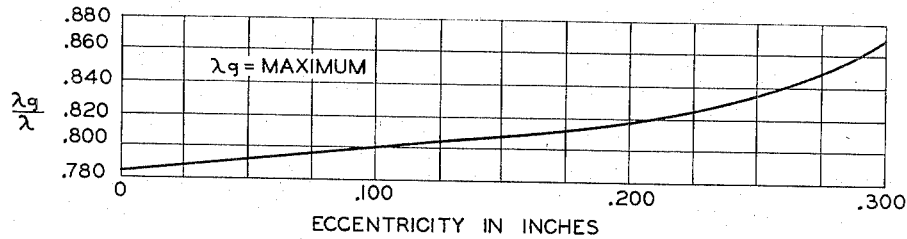
Figure 8:
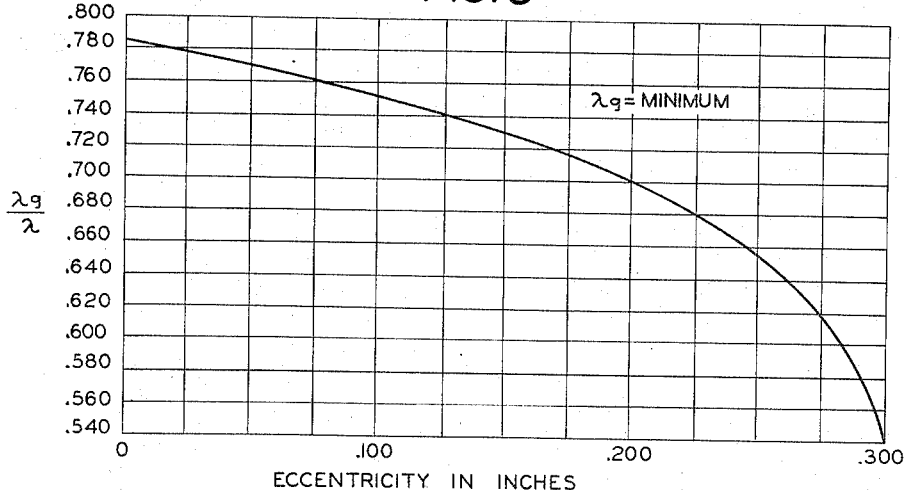

Figs. 6, 7, and 8 are graphs of experimental results obtained from embodiments of the invention.

One application of the present invention, namely a leaky wave guide type of antenna, is disclosed in Fig. 1. The antenna generally indicated by 11 comprises a "coaxial" type wave guide similar to that in Fig. 4 with peripheral slots in and extending around the outer conductor for an angular distance of approximately 120°, depending on the fraction of energy to be radiated per slot. These slots are spaced about one wave length apart to provide a broadside type of array. Inner conductor 13 is rotatably mounted on suitable bearings 20. A mechanical drive 21 is connected to the rotatable inner conductor at its projecting end 14. The input to the antenna is applied at the coaxial coupling 15 whose inner conductor is supported by a shorted quarter wave stub 16. The end of the antenna opposite the input is suitably terminated by termination 17. This may contain absorbing material to absorb such power as is not abstracted from the antenna and thus mitigate undesired standing waves. When inner conductor 13 is rotated, the wave length of the energy is varied in a manner to be later explained in more detail. This variation in wave length causes the radiating beam from slots 12 to move back and forth between the limiting positions 1 and 2. It is thus apparent that rotation of the inner conductor 13 causes the radiated beam to scan over an arc.

The embodiment disclosed in Figs. 2 and 3 may be used as the radiating portion of antenna 11 in Fig. 1. This is seen to be a coaxial type wave guide having a cylindrical metallic inner conductor 13 and a cylindrical metallic outer conductor 18. Inner conductor 13 is eccentrically disposed with respect to outer conductor 18, and is provided with projections 19 axially spaced therealong. These projections are preferably in the form of circular discs and are evenly spaced. When conductor 13 and projections 19 are in the position shown by the solid line in Fig. 3 the wave shortening effect is a maximum, and when the conductor and discs are rotated 180° about line O—O to the dotted position the wave shortening effect is a minimum.

A relatively large number—10 or 12—of projections per wave length in the guide is desirable and in any case where a reasonable power transfer is desired in the number should not be less than two. The inner conductor may be manufactured by cutting away a cylindrical conductor having a cross section corresponding to that of projections 19 or by brazing suitable projections onto a smaller inner conductor, or by die casting.

A qualitative explanation of the experimental results can be seen by considering the strength of the field in which the projections are placed, in both extreme positions. When the projections point toward the nearer wall (the full line position of Fig. 3) the radial electric field in which they are placed is stronger than when they point toward the farther wall (the dotted position in Fig. 3). Therefore the projections produce a minimum wave length or a maximum wave shortening effect when pointing towards the nearer wall, and a minimum wave shortening effect when pointing towards the farther wall. If the rotation occurs, not about the axis of the center conductor O—O, but at the center of projections 19, with the projections retained in the full line position in Fig. 3, inner conductor 13 will move closer to outer conductor 18. This will produce an even lower radial field intensity in the vicinity of the projections than occurs with the projections in the dotted position of Fig. 3, and a materially smaller reduction in the wave length over that occurring with the discs in the dotted position will result. Thus rotation about the center of the projections produces a greater variation in the wave length than rotation about the center of inner conductor 13. In fact about twice the variation in wave length is obtained by this rotation about the center of projections 19.

In Figs. 4 and 5 is disclosed a wave guide similar to that in Figs. 2 and 3 and having the inner conductor rotatable about line O'—O' passing through the center of the projections. The two extreme positions of the conductor are shown in Fig. 5, one in full line and the other in dotted.

The chart in Fig. 6 shows the relationship between the ratio of the wave length in the guide to the wave length in air with respect to the angular position of the inner conductor for the embodiment in Fig. 4. The line used had an inner conductor with disc projection .53" in diameter, 0.062" thick, and spaced .315" on a rod .250" in diameter. The outer conductor was 1.250" (diameter) brass tubing with a .032" wall. The eccentricity of the inner conductor was .160" being measured from the axis of rotation to the axis of the outer conductor.

The graphs in Figs. 7 and 8 are the results of varying the eccentricity of the inner conductor with the projections in a position to give a maximum and a minimum wave length. The inner conductor here was a ¼" rod having disc projections 1⁄16" thick, 17⁄32" in diameter and spaced 5⁄16" on centers. From these graphs it can be seen that the greatest differential change in wave length is obtained when maximum eccentricity is used at both of the extreme positions. Maximum eccentricity is determined by minimum clearance, and if the conductor is rotated about the axis of the discs the same minimum clearance is maintained at all orientations.

This invention is not to be limited except insofar as is necessitated by the prior art and spirit of the appended claims.

We claim:

1. A wave guide having inner and outer conductors, said inner conductor being provided with a plurality of axially spaced projections on one side thereof, said inner conductor being rotatable eccentrically to said outer conductor, whereby the wave length of the energy propagated within said guide may be varied.

2. A wave guide antenna having cylindrical inner and outer conductors, said inner conductor being provided with a plurality of axially aligned spaced projections on one side thereof, the said inner conductor being disposed eccentric to the axis of said outer conductor and being rotatable with respect to said outer conductor, whereby the wave length of the energy propagated within said guide may be varied.

3. A wave guide antenna having cylindrical inner and outer conductors, said inner conductor being provided with a plurality of axially aligned spaced projections on one side thereof, the number of said projections being more than two per wave length of the energy propagated in the guide, said inner conductor being disposed eccentric to the axis of said outer conductor and being rotatable with respect to said outer conductor, whereby the wave length of the energy may be varied.

4. A wave guide antenna having cylindrical inner and outer conductors, said inner conductor being provided with a plurality of axially aligned spaced projections on one side thereof, the number of said projections being more than two and less than 15 per wave length of the energy propagated in the guide, said inner conductor being rotatable about an axis eccentric to the axis of said outer conductor, whereby the wave length of the energy may be varied.

5. A wave guide antenna having cylindrical inner and outer conductors, said inner conductor being provided with a plurality of axially aligned spaced projections on one side thereof, the number of said projections being more than two and less than 15 per wave length of the energy propagated in the guide, means permitting said inner conductor to be rotated about an axis eccentric to the axis of said outer conductor and passing through said projections, whereby the wave length of the energy may be varied.

6. A wave guide antenna having inner and outer conductors, said outer conductor having a plurality of transverse radiating slots, said inner conductor being provided with a plurality of axially eccentric regularly receiving projections on one side thereof, said inner conductor being disposed eccentric to the axis of said outer conductor and rotatable about the axis of said projections, and means to rotate said inner conductor with respect to said outer conductor to vary the wave length within the guide of the wave propagated therein to effect scanning of the radiated beam.

7. A wave guide antenna having inner and outer conductors, said outer conductor having a plurality of spaced transverse radiating slots, said inner conductor being provided with a plurality of axially eccentric regularly recurring projections on one side thereof, said inner conductor being disposed eccentric to the axis of said outer conductor and being rotatable about its own axis with respect to said outer conductor means for coupling electromagnetic energy to said inner conductor, and means to rotate said inner conductor to vary the wave length of the wave within the guide, thereby to effect scanning of the radiated beam.

8. Apparatus for electrically scanning a radiated beam of high frequency energy comprising wave guide having an outer wall containing a plurality of transverse slots to radiate said energy, an eccentrically mounted rotatable inner conductor having a plurality of eccentric projections evenly spaced apart less than a quarter wave length, means to couple high frequency energy to said inner conductor, and means to rotate said inner conductor to vary the wave length in the guide of said energy.

9. A wave guide antenna having inner and outer conductors, said outer conductor having a plurality of peripheral radiating slots spaced approximately one wave length of the energy propagated therein, said inner conductor being provided with a plurality of axially aligned evenly spaced projections on one side thereof, the number of said projections being several per wave length in the guide, said inner conductor being rotatably mounted eccentric to the axis of said outer conductor on suitable bearings supported by said outer conductor, a shorted quarter wave stub located at one end of said outer conductor, a coaxial coupling having an inner conductor supported by said stub and connected to feed electromagnetic energy to said rotatable conductor, a cap terminating the other end of said outer conductor, and means to rotate said first-named inner conductor with respect to said outer conductor to vary the wave length of the wave in the guide, thereby causing the radiated beam to move back and forth in a scanning action.

10. A wave guide having inner and outer conductors, said inner conductor being provided with a plurality of axially aligned evenly spaced projections on one side thereof, the number of said projections being several per wave length of the energy propagated in the guide, said inner conductor being rotatably mounted eccentric to the axis of said outer conductor on suitable bearings supported by said outer conductor, a shorted quarter wave stub located at one end of said outer conductor, a coaxial coupling having an inner conductor supported by said stub and connected to feed electromagnetic energy to said rotatable conductor, a cap terminating the other end of said outer conductor, and means to rotate said first-named inner conductor with respect to said outer conductor to vary the wave length of the wave in the guide.

11. A wave guide antenna having inner and outer conductors, said outer conductor having a plurality of peripheral radiating slots spaced approximately one wave length of the energy propagated therein, said inner conductor being provided with a plurality of axially aligned evenly spaced projections on one side thereof, the number of said projections being several per wave length in the guide, said inner conductor being rotatable about its own axis and mounted eccentric to the axis of said outer conductor on suitable bearings supported by said outer conductor, a shorted quarter wave stub located at one end of said outer conductor, a coaxial coupling having an inner conductor supported by said stub and connected to feed electromagnetic energy to said rotatable conductor, a cap terminating the other end of said outer conductor, and means to rotate said inner conductor with respect to said outer conductor to vary the wave length of the wave in the guide, thereby causing the radiated beam to move back and forth in a scanning action.

12. A wave guide having inner and outer conductors, said inner conductor being provided with a plurality of axially aligned evenly spaced projections on one side thereof, the number of said projections being several per wave length of the energy propagated in the guide, said inner conductor being rotatable about its own axis and mounted eccentric to the axis of said outer conductor on suitable bearings supported by said outer conductor, a shorted quarter wave stub located at one end of said outer conductor, a coaxial coupling having an inner conductor supported by said stub and connected to feed electromagnetic energy to said rotatable conductor, a cap terminating the other end of said outer conductor, and means to rotate said inner conductor with respect to said outer conductor to vary the wave length of the wave in the guide.

References Cited in the file of this patent

UNITED STATES PATENTS

| Number | Name | Date |
| --- | --- | --- |
| 2,226,479 | Pupp | Dec. 24, 1940 |
| 2,405,437 | Leeds | Aug. 6, 1946 |
| 2,408,435 | Mason | Oct. 1, 1946 |
| 2,433,368 | Johnson | Dec. 30, 1947 |
| 2,438,735 | Alexanderson | Mar. 30, 1948 |
| 2,453,414 | De Vore | Nov. 9, 1948 |
| 2,477,510 | Chu | July 26, 1949 |